United States Patent [19]

Tanaka et al.

[11] 4,273,184
[45] Jun. 16, 1981

[54] SOLAR HEAT UTILIZED AIR-CONDITIONING SYSTEM

[75] Inventors: Shunroku Tanaka, Tokyo; Jun Inoue, Matsubara; Katsurou Yukimachi, Sakai; Keiichi Minamino, Matsubara, all of Japan

[73] Assignee: Osaka Gas Kabushiki Kaisha, Osaka, Japan

[21] Appl. No.: 939,317

[22] Filed: Sep. 5, 1978

[51] Int. Cl.³ .............................................. F24F 7/00
[52] U.S. Cl. ......................................... 165/59; 165/62; 165/63; 165/64; 62/2; 62/238.3; 62/324.2; 237/2 B; 126/428
[58] Field of Search ..................... 62/2, 238 B, 324 B, 62/160; 165/48, 48 S, 16, 29, 66; 237/1 A, 2 B; 126/428

[56] References Cited

U.S. PATENT DOCUMENTS

| | | | |
|---|---|---|---|
| 3,927,713 | 12/1975 | Gilles | 165/16 |
| 4,034,738 | 7/1977 | Barber | 237/1 A X |
| 4,070,870 | 1/1978 | Bahel et al. | 62/2 |
| 4,113,004 | 9/1978 | Rush et al. | 165/66 X |
| 4,123,003 | 10/1978 | Winston | 237/1 A |
| 4,143,705 | 3/1979 | Awalt | 237/1 A X |
| 4,171,621 | 10/1979 | Trelease | 62/160 |

OTHER PUBLICATIONS

PPG Baseline Solar Collector Publication.

Primary Examiner—Albert W. Davis
Assistant Examiner—Margaret A. Focarino
Attorney, Agent, or Firm—Edwin E. Greigg

[57] ABSTRACT

A solar heat utilized air-conditioning system comprising: a solar heat collecting unit for producing warm water by heating a circulating heating medium water by solar heat obtained by collector plates disposed in parallel with each other; an absorption type refrigerating machine for producing cold water by provoking a refrigerating cycle, using the warm water produced by said solar heat collecting unit as the heat source for a generator; a main heat exchanger which indirectly heat-exchanges an intake fresh-air for a circulating cold or warm water in an air-conditioning unit disposed on the way of a fresh-air intake path to a space to be air-conditioned, thereby to produce cooling or heating air; an air-cooling and heating apparatus capable of selectively supplying the circulating cold or warm water to said main heat exchanger; and an auxiliary heat exchanger capable of selectively flowing either warm water produced by said solar heat collecting unit or cold water produced by said absorption type refrigerating machine, said main heat exchanger and said auxiliary heat exchanger being disposed in parallel with and adjacent to each other in said air-conditioning unit with said auxiliary heat exchanger disposed at the fresh-air intake side thereof.

2 Claims, 5 Drawing Figures (a)

(b)

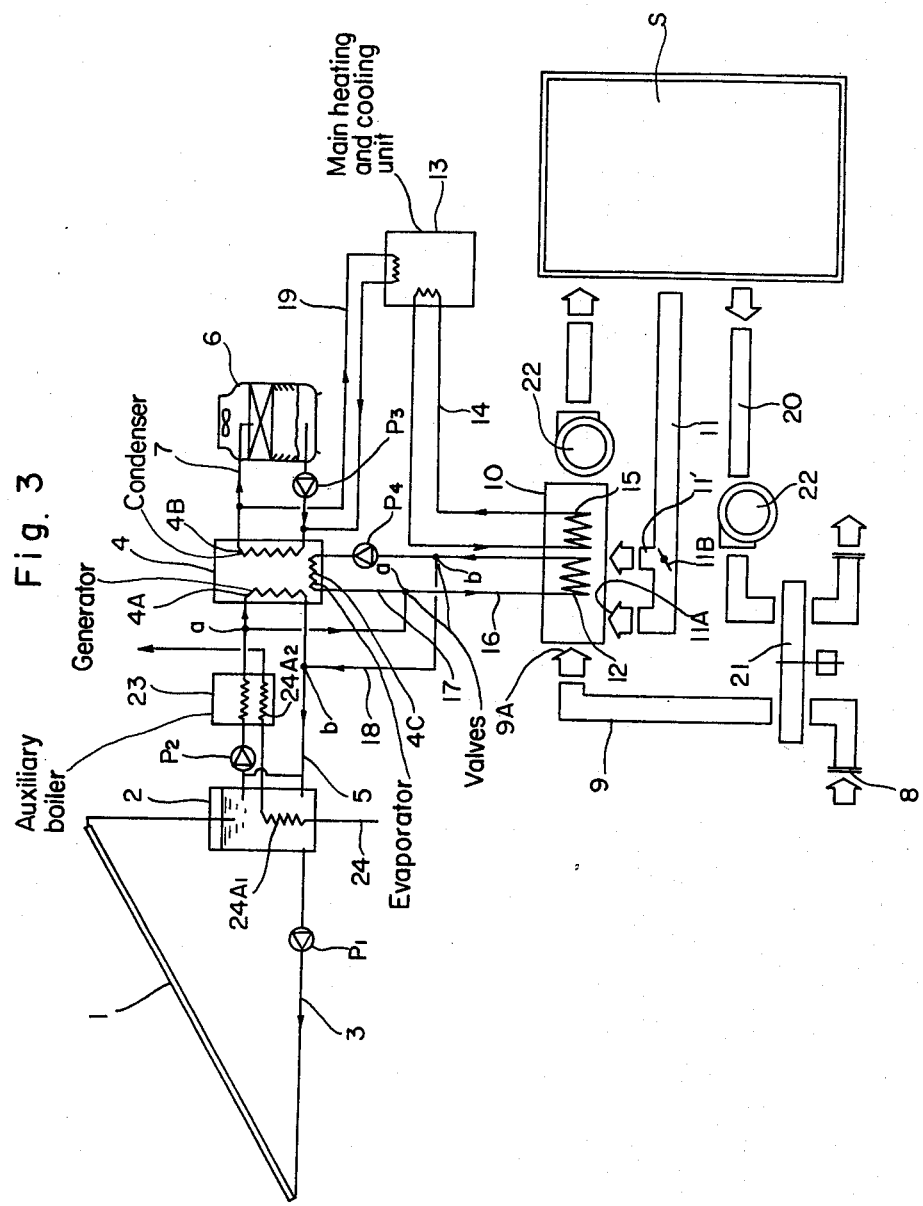

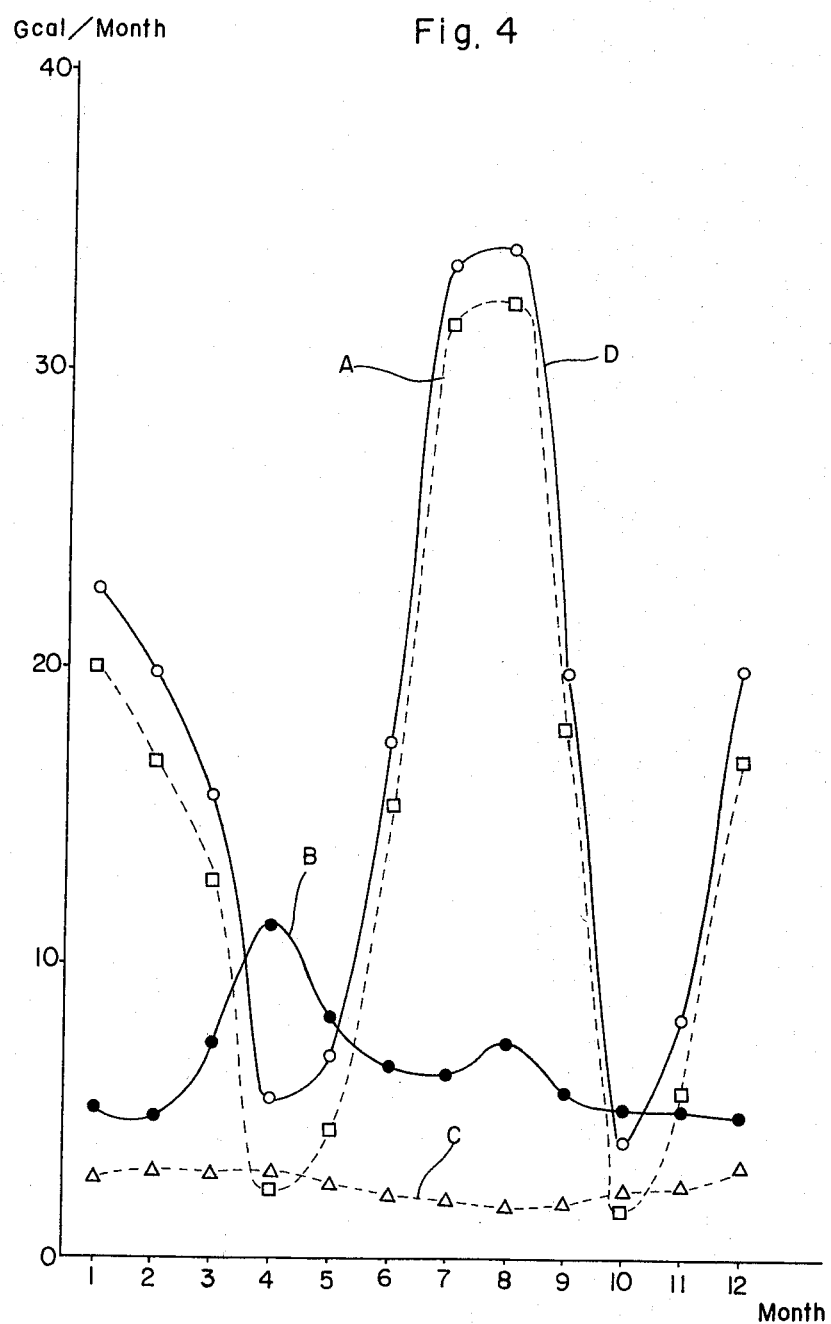

SOLAR HEAT UTILIZED AIR-CONDITIONING SYSTEM

BACKGROUND OF THE INVENTION

This invention relates to an air-conditioning system in which heating medium water is heated by solar heat obtained by a solar heat collecting unit and thus heated warm water is circulated, (i) in the cold season for which heating is required, directly to an air-conditioning unit for heating purposes, or (ii) in the hot season for which air-cooling is required, to an absorption type refrigerating machine as a driving heat source, thereby to obtain cold water, which is subsequently circulated to the air-conditioning unit for air-cooling purposes, and when solar heat cannot be obtained in rainy or cloudy days or when the air-conditioning load for a space to be air-conditioned becomes too much, an air-cooling and heating apparatus of high efficiency may back up the air-conditioning effect.

There has conventionally been known this kind of air-conditioning system, for example, as shown in FIG. 1, in which warm water heated by a solar heat collecting unit 1' and stored in a regenerator tank 2' through a circulating pump P1' is circulatingly supplied, as a heat source, through a pump P2' to a generator 4A' of a warm water heating absorption type refrigerating machine 4', which is connected to a cooling tower 6' through a pump P3'. In this refrigerating machine 4', a refrigerant contained therein such as ammonia or lithium bromide is repeatedly subjected to a refrigerating cycle of evaporation-condensation-vaporization-absorption, thereby to provoke a cooling action, thus producing cold water.

In the hot season for which air-cooling is required, thus produced cold water is circulatingly supplied to a fan coil unit 10' disposed in a space to be air-conditioned S', through a cold water circuit 17' by a pump P4' for air-cooling the space to be air-conditioned S'. On the other hand, in the cold season for which heating is required, the warm water in the regenerator tank 2' is not supplied to the refrigerating machine 4' but circulatingly supplied to the fan coil unit 10' through a warm water circuit 18' by the pump P2' for heating the space to be air-conditioned S'.

Naturally, three-directional switch valves are disposed at points a' and b', respectively, for switching the circulating path of warm water from the regenerator tank 2'. However, as a source of energy for air-cooling and heating, such a conventional system has fully relied on only solar heat obtained by the solar heat collecting unit 1', and a boiler 23' is used for providing air-conditioning in the case no solar heat is available. In such a conventional system, following inconveniences have therefore been noted:

(i) Air-conditioning load greatly varies throughout the year. In a conventional system, the solar heat collecting unit 1' has to be designed to have a solar heat collecting capacity covering the maximum air-conditioning load in the year, thus requiring a great number of solar heat collector plates, so that the solar heat collecting unit 1' itself becomes large-sized.

(ii) Not only the air-conditioning load but also solar radiation vary throughout the year, thus requiring the regenerator tank 2' having a considerable capacity in order to always provide appropriate air-conditioning.

(iii) It requires a boiler 23' having a capacity approximately as much as that of a usual air-conditioning system utilizing no solar heat to provide appropriate air-conditioning when no solar heat can be collected at all in a cloudy weather or during the night.

By reason of the above (i) to (iii), the cost of equipment for the solar heat collecting unit 1', regenerator tank 2' and boiler 23' has become very expensive.

Furthermore, in the intermediate seasons, and at the begining and end of the air-cooling or heating season, collected solar heat energy has been larger than the required air-conditioning load and the surplus solar heat has been wasted without being utilized.

Although solar heat has been utilized for the purpose of energy-saving, variations in the air-conditioning load and solar radiation throughout the year have thus resulted in increased cost of equipment and rendered collected solar heat futile. A very long period of time has therefore been required for repaying the cost of equipment, so that such a conventional system has not actually been economical from the viewpoint of the life-time of the system.

Since such a conventional system has been formed large-sized, a broad installation place has been required and piping cost has subsequently been increased.

In addition, because of the necessity to dispose various units each having a high capacity, much power energy has been required also for circulating pumps.

Furthermore, in order to dehumidify, cold water of 6° to 8° C. is required. In this connection, in order to provide cold water of a temperature as low as 6° to 8° C. at the outlet of the warm water heating absorption type refrigerating machine 4', the temperature of the heating medium (warm water supplied from the regenerator tank 2') should be 80° C. or more. This becomes apparent from FIG. 2 (a) and (b) showing the relationship of the cold water outlet temperature T(°C.) with respect to the chiller COP (coefficient of performance) and the refrigerating capacity P (Kcal/h) with the warm water inlet temperature ($\theta$) as parameter ($\theta_1 = 100°$ C., $\theta_2 = 95°$ C., $\theta_3 = 90°$ C., $\theta_4 = 85°$ C., $\theta_5 = 80°$ C., $\theta_6 = 75°$ C.). Consequently, the temperature of the regenerator tank warm water for operating the refrigerating machine 4' has had to be kept high, and the temperature difference between the heat collecting unit 1' and the regenerator tank 2' has subsequently been small, thus resulting in a low heat collecting efficiency, which has made the depreciation period of the system further longer.

When no solar heat is available, the refrigerating machine 4' has to be operated by heated water supplied from the boiler 23'. Therefore, the whole efficiency has become 45 to 50% (the boiler efficiency of about 75% multiplied by the refrigerating machine's COP of 0.6 to 0.7), resulting in great waste of energy.

SUMMARY OF THE INVENTION

In view of the actual situation of the prior art as abovementioned, it is an object of the present invention to provide a practical and economical solar heat utilized air-conditioning system capable of saving energy, in which a solar heat collecting unit, a regenerator tank and other units may be formed in a small size while increasing the solar heat collecting efficiency, and obtained solar heat may be utilized as much as possible without substantial waste throughout the year, thus permitting the cost of equipment to be readily repayed in a short period of time.

It is another object of the present invention to provide further saving of necessary energy.

Other objects and advantages of the present invention will become apparent from the "Detailed Description of Preferred Embodiments" described hereinafter.

A solar heat utilized air-conditioning system in accordance with the present invention comprises: a solar heat collecting unit having a plurality of collector plates in parallel with each other, in which a heating medium water stored in a regenerator tank is forcibly circulated through a pump and such circulating heating medium water is heated by solar heat obtained by the collector plates, thereby to produce warm water; an absorption type refrigerating machine in which the warm water thus produced by the solar heat collecting unit is circulatingly flowed to a generator, so as to provoke a refrigerating cycle of evaporation-condensation-vaporization-absorption of an incorporated refrigerant, thereby to produce cold water; a main heat exchanger which indirectly heat-exchanges an intake fresh-air for a circulating cold or warm water in an air-conditioning unit disposed on the way of a fresh-air intake path to a space to be air-conditioned, thereby to produce cooling or heating air; a main cooling and heating apparatus capable of selectively supplying a circulating cold or warm water to the main heat exchanger; and an auxiliary heat exchanger capable of selectively flowing either warm water produced by the solar heat collecting unit or cold water produced by the absorption type refrigerating machine, the main heat exchanger and the auxiliary heat exchanger being disposed in parallel with and adjacent to each other in the air-conditioning unit with the auxiliary heat exchanger disposed at the fresh-air intake side thereof.

Concerning a source of energy for air-conditioning, the solar heat utilized air-conditioning system in accordance with the present invention does not fully rely on only either solar heat as a conventional solar heat utilized air-conditioning system, or external energy (fuel gas or electricity) exerted to an air-cooling and heating apparatus as a conventional usual type air-conditioning system, but both solar heat and external energy are utilized, namely, the solar heat is used for pre-cooling or pre-heating for providing air-conditioning. The heat collecting unit may therefore be constructed so as to have a solar heat collecting capacity less than the maximum air-conditioning load throughout the year, for example, 30% of the maximum load, namely covering the air-cooling load around June in the case of Japan, and may perform the following operation.

Around June, the present air-conditioning system may provide air-cooling by the absorption type refrigerating machine with only solar heat. In the season for which maximum air-cooling load is required in July and August, 30% of the maximum load may be covered by solar heat serving as pre-cooling energy, and the remaining air-cooling load may be covered by the main cooling and heating apparatus. For heating, the same may be applied. Thus, according to the present invention, collected solar heat may efficiently be utilized as much as possible without substantial waste throughout the year.

In addition, since the solar heat collecting capacity of the heat collecting unit is smaller than the maximum load throughout the year, the number of collector plates may be reduced and the heat collecting unit may be formed in a small size. Furthermore, even if an air-conditioning load over the capacity of the heat collecting unit is required, obtained solar heat is merely utilized for pre-heating or pre-cooling, so that the capacity of the regenerator tank may considerably be smaller than that for covering the maximum load. As the whole, equipment for collecting and storing solar heat may therefore be formed economically in a small size, which permits the power for circulating pumps to be reduced.

As previously mentioned, since air-cooling provided by the absorption type refrigerating machine which is operated by utilizing solar heat, is used as pre-cooling, the cold water outlet temperature is not necessarily lowered to 6° to 8° C. as should be in a conventional solar heat utilized air-conditioning system, but may be set to a temperature higher than 6° to 8° C. It is therefore possible to lower the temperature of the heating medium (warm water) for actuating the absorption type refrigerating machine, up to 75° to 70° C. (See FIG. 2 (a) and (b)). This permits the regenerator tank warm water for operating the refrigerating machine to be low, so that the temperature difference between the heat collecting unit and the regenerator tank becomes big, thus improving the heat collecting efficiency of the heat collecting unit. This is also possible for the heating.

As thus described, in accordance with the present invention, the whole equipment may economically be formed in a small size while improving the heat collecting efficiency, and obtained solar heat may always be utilized as much as possible without substantial waste in spite of the variations in air-conditioning load or solar radiation throughout the year, thus permitting the cost of equipment to be repayed in a short period of time, whereby the solar heat utilized air-conditioning system may be realized from the viewpoint of practice and economy.

It would be noted that when no solar heat is available, a highly efficient air-cooling and heating apparatus of which refrigerating machine's COP is for example 0.95 to 1.0, may be used for further backing up the air-conditioning effect.

BRIEF DESCRIPTION OF THE DRAWINGS

The present invention will be further described by way of example, with refrence to the accompanying drawings, in which:

FIG, 1 is a flowchart showing a conventional solar heat utilized air-conditioning system;

FIG. 3 is a flowchart showing an embodiment of a solar heat utilized air-conditioning system in accordance with the present invention; and FIG. 4 is an example of a graph showing the annual variations in the amount of used solar heat and the air-conditioning load in the system of FIG. 3.

DETAILED DESCRIPTION OF PREFERRED EMBODIMENTS

Figure 1:
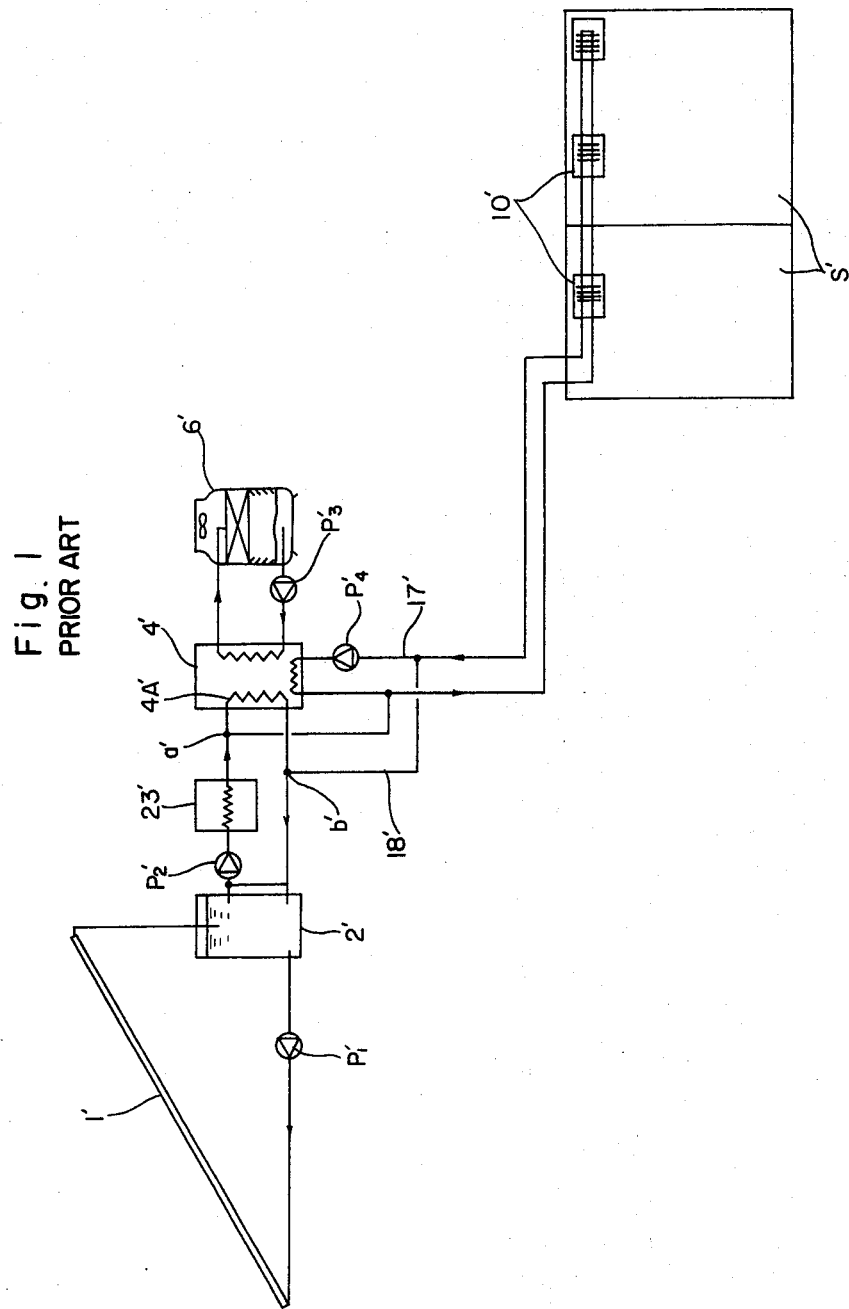
Figure 2:
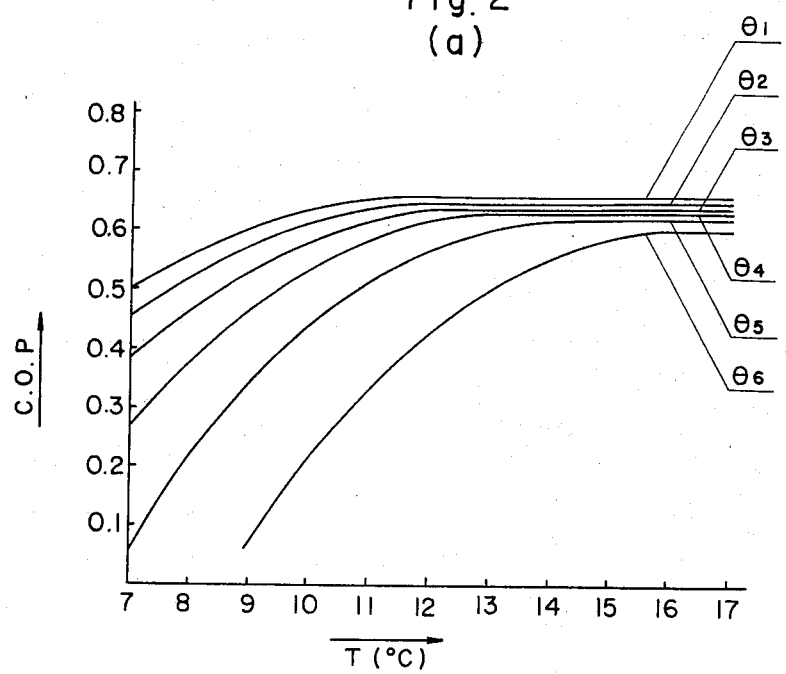
FIG. 2 (a) and (b) are graphs showing the characteristics of the COP and the cooling capacity of a chiller in a warm water heating absorption type refrigerating machine to be heated by warm water produced by solar heat, with respect to the cold water outlet temperature, respectively.
Figure 2:
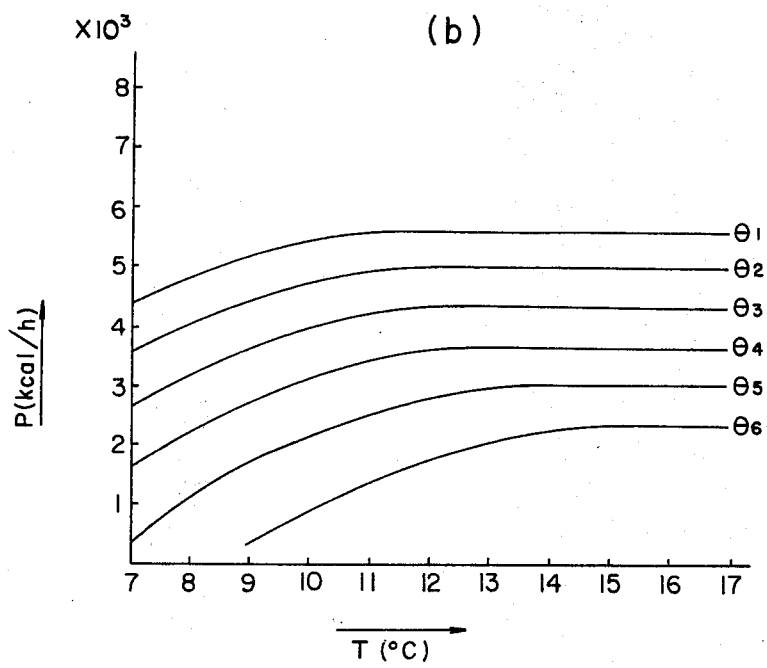

In FIG. 3, a solar heat collecting unit 1 in which a relatively small number of collector plates (not shown) are incorporated in parallel with each other, is connected to a regenerator tank 2 of relatively low capacity by a heating medium water circulating circuit 3 in which a circulating pump P1 is disposed. A regenerator tank 2 is connected to a generator 4A of a single effect absorption type refrigerating machine 4 by a warm water circulating circuit 5 in which a circulating pump P2 is disposed. A condenser 4B of the refrigerating machine 4 is connected to a cooling tower 6 by a cooling water circulating circuit 7 in which a circulating pump P3 is disposed.

In an air-conditioning unit 10 disposed in a fresh-air intake path 9 from a fresh-air intake port 8 to a space to be air-conditioned S, a pre-cooling and pre-heating auxiliary heat exchanger 12 is disposed at the side of the communication starting end 9A of the fresh-air intake path 9 and at the side of the communication starting end 11A of an air return path 11 to the air-conditioning unit 10 from the space to be air-conditioned S.

At the downstream side of this auxiliary heat exchanger 12, a cooling and heating main heat exchanger 15 is disposed in parallel therewith in the air-conditioning unit 10, and this main heat exchanger 15 is connected to an main cooling and heating apparatus 13 through a cold and warm water circulating circuit 14.

A branched path 11' from the air return path 11 is provided at the branched portion thereof with a damper 11B, and is opened at and communicates with the intermediate portion between the heat exchangers 12 and 15. In the particulary less load and humid season, this branched path 11' may be used for positively removing previously moisture from intake fresh-air by the auxiliary heat-exchanger 12, thereby to mix the circulating air with the fresh air of which humidity has thus been lowered. However, the communication starting end 11A is normally used. Thus, cold or warm air after having been used for air-conditioning, may be reused as air-conditioning energy, thus realizing energy-saving.

The auxiliary heat exchanger 12 is connected to a cold and warm water circulating circuit 16, which is divided into two portions, One is a cold water circuit 17 which is connected to an evaporator 4C of the refrigerating machine 4 with a circulating pump P4 incorporated therein. The other is a warm water circuit 18 which is connected to the intermediate portion of a circuit 5 connecting the regenerator tank 2 to the refrigerating machine 4. These cold water circuit 17 and warm water circuit 18 are constructed so as to be selectively switched by three-directional switch valves (not shown) disposed at the branched portions a and b.

The main cooling and heating apparatus 13 is a double effect absorption type whose C.O.P. is in a very high range of 0.9-1.0 as is generally called a high efficient type, too. This apparatus 13 is actuated by a gas burner (not shown) incorporated therein and is capable of selectively providing cold water or warm water to the cold and warm water circulating circuit 14 according to switching operations of valves (not shown) therefor. The numeral 19 indicates a cooling water circulating circuit for connecting a condensor of the main cooling and heating apparatus 13 with the cooling tower 6. The energy source for the main cooling and heating apparatus 13 is not limited to gas as described above. Any other energies except for solar heat, for example, electricity or kerosene may be utilized for it.

Between the fresh-air intake path 9 and an exhaust path 20, a rotary heat exchanger 21 is disposed for previously cooling or heating an intake fresh-air, thus also contributing to energy-saving.

Fans are generally designated by 22. An auxiliary heating boiler 23 may be disposed in the case a hot water supply line 24 is provided. This boiler 23 is disposed in the warm water supply circuit from the heat collecting unit 1, and in the hot water supply line 24 first and second heat exchange coils 24A2 are formed in the regenerator tank 2 and in the boiler 23, respectively. It may also be possible to form the system without incorporating such an auxiliary boilder 23.

The description hereinbelow discuss in detail how to operate the air-conditioning system constructed as described above.

After being heated by solar heat obtained by the collector plates in the heat collecting unit 1, the heating medium water is stored in the regenerator tank 2. For air-cooling purposes, such heating medium water is supplied as warm water to the generator 4A of the refrigerating machine 4 thereby to evaporate a refrigerant such as ammonia or lithium bromide. This evaporated refrigerant comes in contact with the condenser 4B, where the refrigerant is subsequently condensed. Thereafter, the refrigerant is vaporized in the evaporator 4C, thereby to cool the water in the cold water circuit 17. Thus vaporized vapor is then re-absorbed by the refrigerant. Such a refrigerating cycle of evaporation-condensation-vaporization-absorption of a refrigerant is then repeated. Then, this cold water is circulated to the air-conditioning unit 10 for pre-cooling the intake fresh-air through the fan 22, by the auxiliary heat-exchanger 12 therein.

On the other hand, for heating purposes, the heating medium water in the regenerator tank 2 is not supplied to the refrigerating machine 4, but directly heats the water in the warm water circuit 18, thereby to pre-heat the intake fresh-air through the fan 22, by the auxiliary heat-exchanger 12 in the air-conditioning unit 10. When no solar heat is available or air-conditioning load becomes big, the main cooling and heating apparatus 13 may be used for back-up purposes, and when the air-conditioning load exceeds the capacity of the main cooling and heating apparatus 13, the boiler 23 may then be used.

The intake fresh-air thus pre-cooled or pre-heated by the air-conditioning unit 10 is supplied to the main heat exchanger 15. There, it is finally cooled or heated upto the desired temperature by cold or warm water supplied by the cold and warm water circulating circuit 14, thus providing cooling or heating air to be supplied to the space to be air-conditioned S.

Portions of cooling air or heating air which have been used for air-conditioning the space S, are then returned to the air-conditioning unit 10 through the air return path 11, thereby to be re-used as energy for air-cooling or heating.

Portions of the remaining are exhausted to the outside through the exhaust path 20. At this time, in the rotary heat exchanger 21 such exhaust air is heat-exchanged with intake fresh-air, whereby the intake fresh-air is pre-cooled or pre-heated.

The heat collecting unit 1 and the regenerator tank 2 are constructed so as to cover approximately 30% (corresponding to the air-cooling load in June in Japan) of the maximum air-conditioning load throughout the year. It is therefore possible as far as solar heat is available to provide air-conditioning only by obtained solar heat almost without operating the main cooling and heating apparatus 13 in the air-cooling season around June and September, or in the heating season around March and November. Around July and August, or around December, January and February, air-conditioning may be provided by operating the main cooling and heating apparatus 13 in cooperation with solar heat.

FIG. 4 shows the characteristics of the annual variations in the air-conditioning load and the used amount of solar heat (Gcal/month), where the axis of abscissa shows the months, (A) is the air-conditioning load, (B) is the used solar heat amount, (C) is the hot water supply load and (D) is the total load of the air-conditioning and the hot water supply.

An main cooling and heating apparatus of the type in which a gaseous medium for the main heat exchanger 15 is used, may also be used, in addition to the type in which a liquid medium is used as shown in the above example.

The fact that the heat collecting unit 1 and the regenerator tank 2 may be formed in a small size, permits these heat collecting unit 1, the regenerator tank 2, the refrigerating machine 4, the cooling tower 6, the air-conditioning unit 10 and the main cooling and heating apparatus 13 to be collectively installed en bloc on the rooftop of an apartment house, thus advantageously shortening the pipings. Further advantage is that the cooling tower for the main-cooling and heating apparatus 13 may be used in common also for the refrigerating machine 4.

What we claim is:

1. A cooling and heating system utilizing solar heat comprising;
    an air-conditioning unit (10) disposed intermediately of a fresh-air intake path (9) leading to space (S) to be air conditioned, said air-conditiong unit (10) having a main heat exchanger (15) and an auxiliary heat exchanger (12) arranged in parallel with and adjacent to each other therein with said auxiliary heat exchanger (12) disposed at a fresh-air intake side thereof,
    a main cooling and heating apparatus (13) of a type not utilizing solar heat and capable of selectively supplying cold or warm water to said main heat exchanger (15),
    an auxiliary cooling and heating apparatus of a type utilizing solar heat and capable of selectively supplying cold or warm water to said auxiliary heat exchanger (12), said auxiliary cooling and heating apparatus including; a solar heat collecting unit (1), a regenerator tank (2) for storing warm water heated by solar heat obtained by said solar heat collecting unit (1), an absorption type refrigerating machine (4) for producing cold water by provoking a refrigerating cycle of evaporation-condensation-vaporization-absorption of an incorporated refrigerant using the heat of the warm water supplied from said regenerator tank (2), warm water circuits (5) (18) for supplying the warm water from said generator tank (2) selectively to said absorption type refrigerating machine (4) or to said auxiliary heat exchanger (12), and a cold water circuit (17) for selectively supplying or not supplying the cold water from said absorption type refrigerating machine (4) to said auxiliary heat exchanger (12),
    an air return path (11) extended from said space to be air-conditioned (S) and being opened in and communicated with said air conditioning unit (10) at a portion of a fresh-air intake side with respect to said auxiliary heat exchanger (12), said air return path (11) being provided with a branched path (11') opened in and communicated with said air conditioning unit (10) at an intermediate portion between said main and auxiliary heat exchangers (15), (12), and a damper (11B) to selectively open and close said branched path (11'), and
    a further heat exchanger (21) disposed between said fresh-air intake path (9) and an exhaust path (20) extending from said space to be air-conditioned (S).

2. A solar heat utilized air-conditioning system as set forth in claim 1, wherein a heating auxiliary boiler (23) is disposed in a warm water supply line from said solar heat collecting unit (1) to said absorption type refrigerating machine (4) or said auxiliary heat exchanger (12), and first and second heat exchanger coils (24A1 and 24A2) formed at a hot water supply line (24) are disposed in said regenerator tank (2) and said boiler (23), respectively.

* * * * *